United States Patent
Hofmann et al.

(10) Patent No.: US 6,701,780 B2
(45) Date of Patent: Mar. 9, 2004

(54) WHEEL BEARING FOR MEASURING THE CONTACT FORCES BETWEEN TIRE AND ROAD

(75) Inventors: Heinrich Hofmann, Schweinfurt (DE); Jens Heim, Schweinfurt (DE); Roland Werb, Riedbach (DE); Peter Niebling, Bad Kissingen (DE); Roland Langer, Schwanfeld (DE); Rainer Breitenbach, Gochsheim (DE)

(73) Assignee: Fag Automobiltechnik AG (DE)

( * ) Notice: Subject to any disclaimer, the term of this patent is extended or adjusted under 35 U.S.C. 154(b) by 0 days.

(21) Appl. No.: 10/067,651

(22) Filed: Feb. 4, 2002

(65) Prior Publication Data

US 2003/0145651 A1 Aug. 7, 2003

(30) Foreign Application Priority Data

Feb. 2, 2001 (DE) .......................................... 101 05 298

(51) Int. Cl.[7] ............................................. G01M 17/02
(52) U.S. Cl. ......................................... 73/146; 152/245
(58) Field of Search ................................. 73/146, 129, 9, 73/8, 865.8, 146.4; 152/450

(56) References Cited

U.S. PATENT DOCUMENTS 6,002,248 A * 12/1999 Binder ........................ 324/160
6,161,431 A * 12/2000 Drahne et al. .............. 152/245

* cited by examiner

Primary Examiner—Edward Lefkowitz
Assistant Examiner—Alandra Ellington
(74) Attorney, Agent, or Firm—Ostrolenk, Faber, Gerb & Soffen, LLP

(57) ABSTRACT

A wheel bearing unit that measures the contact forces between the tire and the road under all driving situations including operation of the brake, and provides information for the vehicle operation control systems and for optimizing the braking process, the unit including first sensors arranged on the stationary part of the wheel bearing in order to measure the forces acting in the wheel bearing, and second sensors arranged on a support members for the disk-brake caliper for continuously determining the acting braking forces.

7 Claims, 9 Drawing Sheets

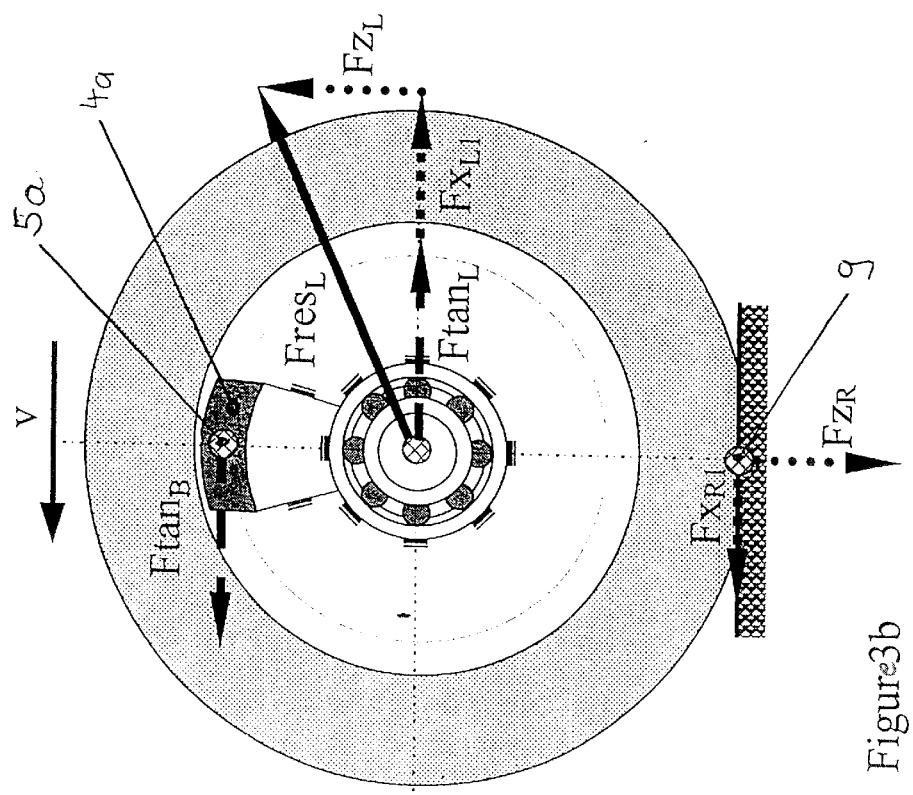
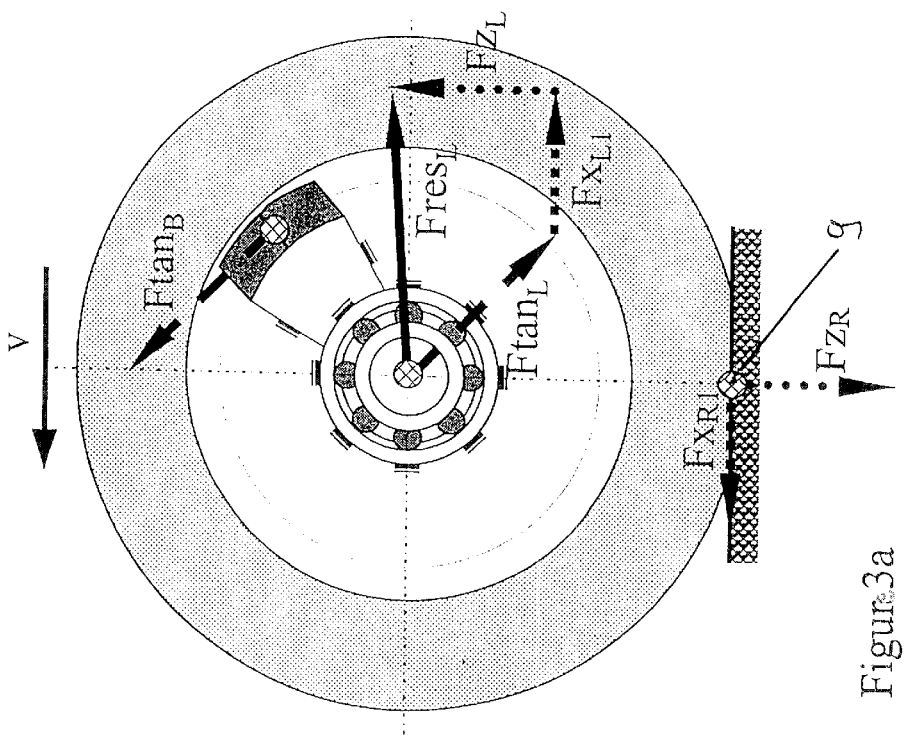

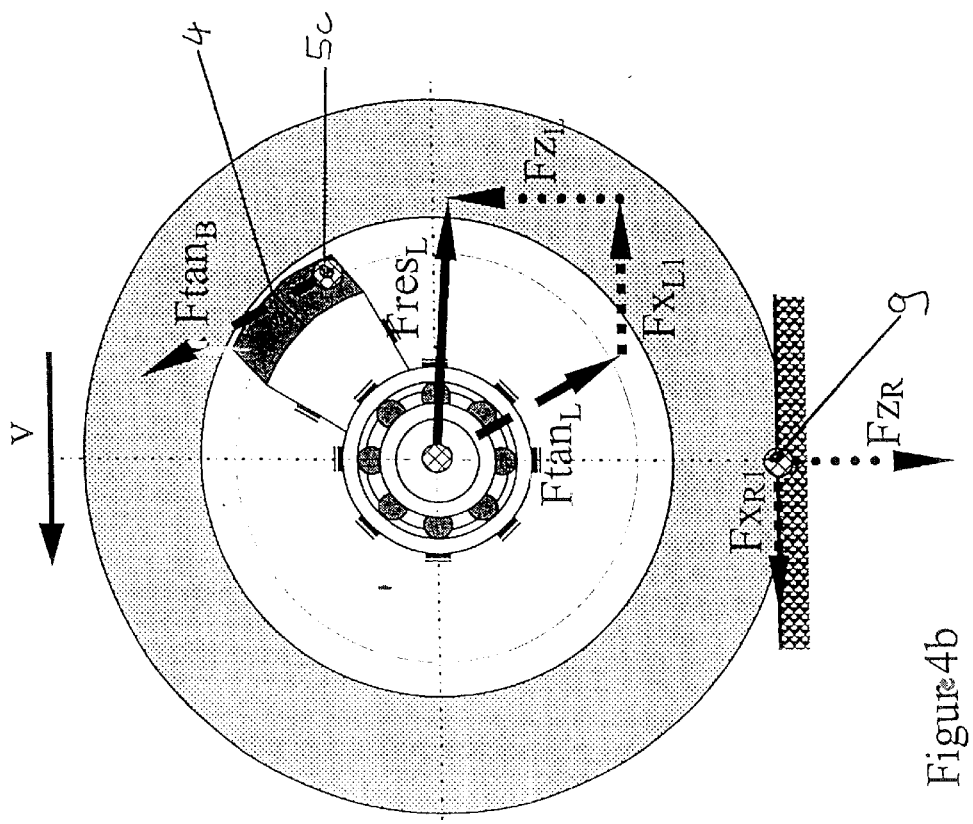
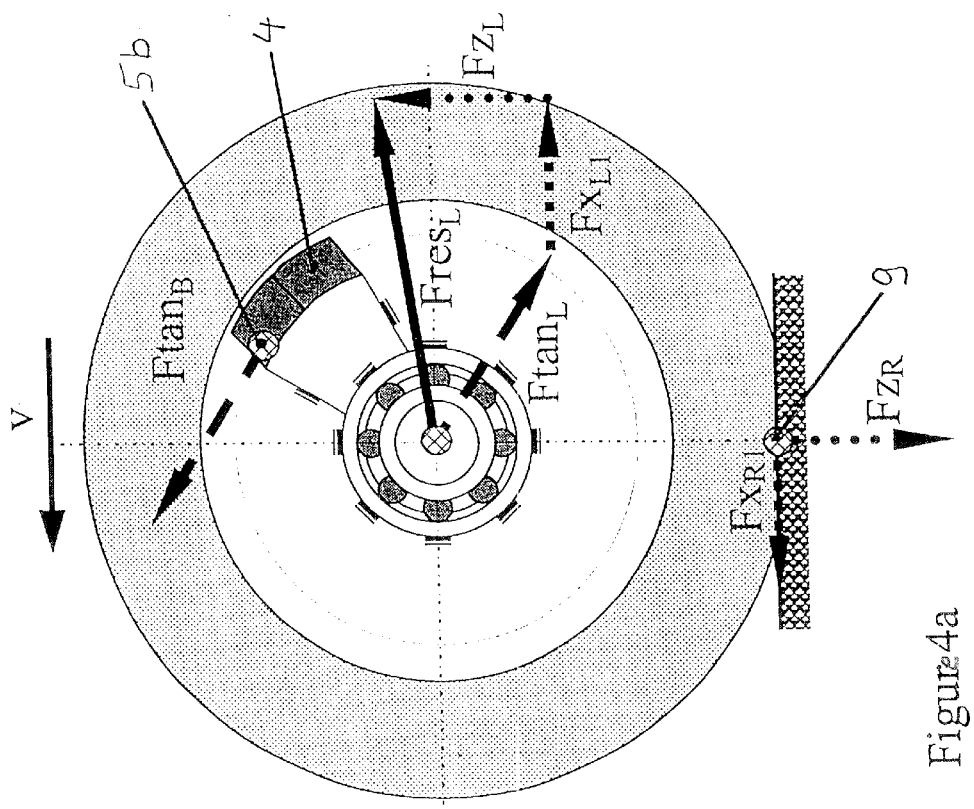
Figure 4b
Figure 4a

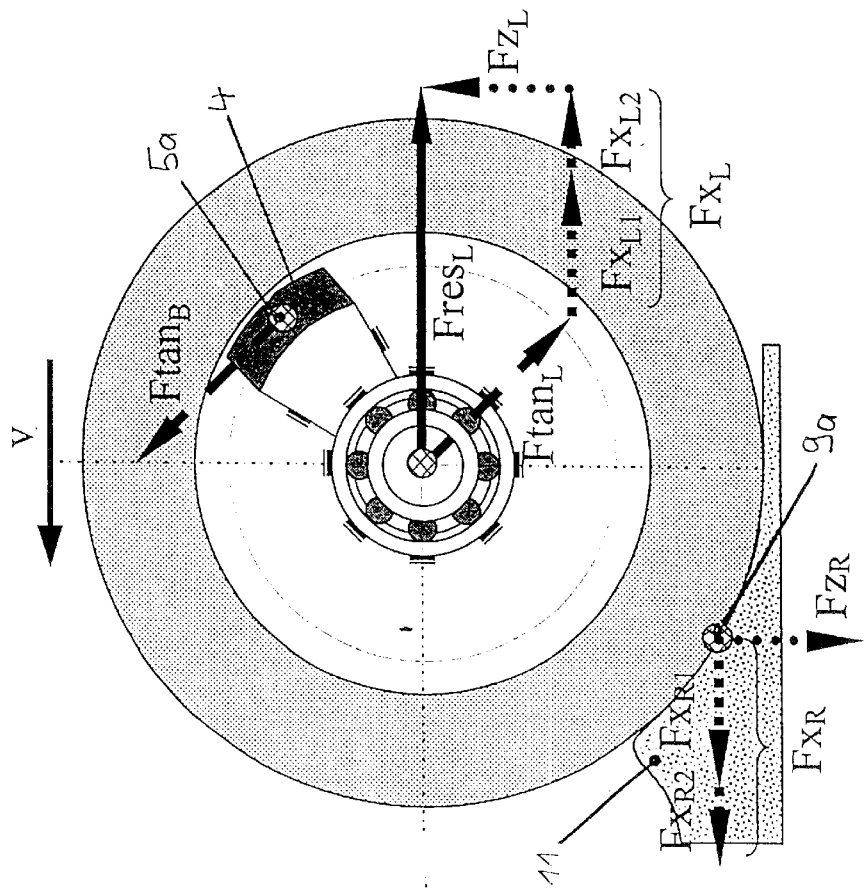
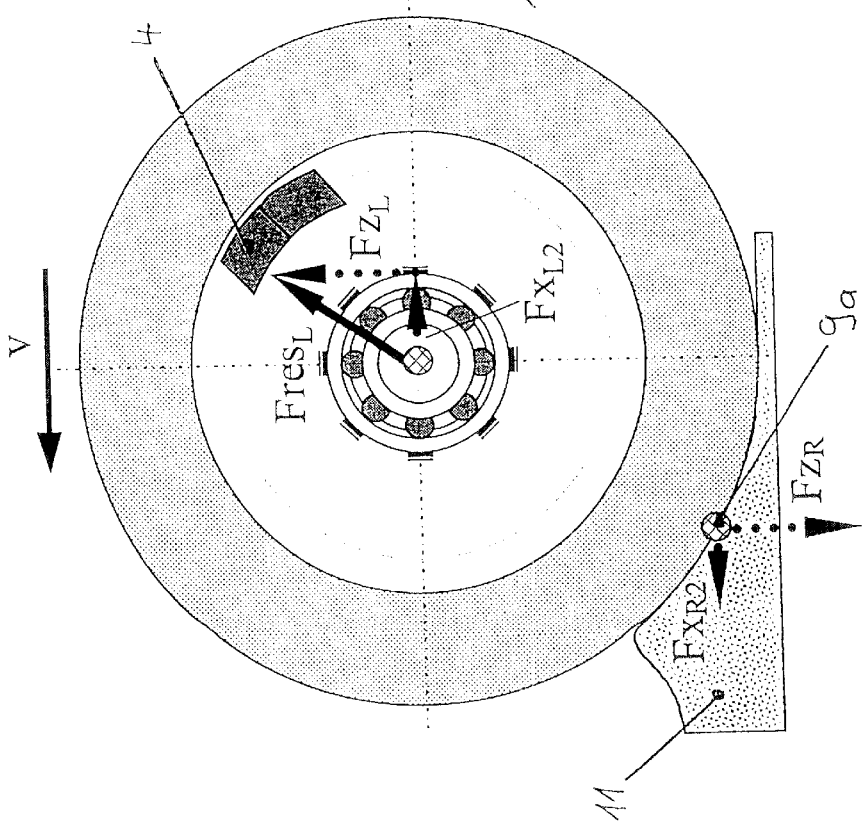
Figure 5b
Figure 5a

WHEEL BEARING FOR MEASURING THE CONTACT FORCES BETWEEN TIRE AND ROAD

FIELD OF THE INVENTION

The invention concerns a wheel bearing, which enables conclusions to be drawn as to the forces which act between the road surface and the tires of a motor vehicle particularly by measuring the forces currently acting within the stationary ring of the wheel bearing.

BACKGROUND OF THE INVENTION

To improve the safety and traveling comfort of modern vehicles, the electronic control systems require increasingly more information about the current driving situation for the operation of the vehicle. In addition to the current data on the engine, the gearbox and the rotational speed of the individual wheels, the current forces and force directions (wheel contact forces) which act on the individual tires will also be employed in future for control of vehicle operation. There have been various attempts to record these forces: e.g. measuring forces in the tire or inserting measurement adaptors between the wheel rim and the acceptance flange (DE 196 27 385 or "Erfassung der mehr axialen Fahrbetriebsbelastungen mit dem Meβrad "Velos"", A. Rupp, W. Diefenbach, V. Grubisic, ATZ Automobiltechnische Zeitung 96 (1994)). These attempts at a solution all have the problem that the forces must be transmitted from a rotating part. For this purpose, additional complexity is necessary, such as the employment of telemetric data transmission or the use of sliding contacts. In this connection, one obvious possibility for recording these wheel contact forces is to use the wheel bearings, because these transmit to the vehicle framework all the forces which act on the tire.

EP 0 432 122 A2 shows a wheel bearing unit in which sensors are arranged at various locations on the stationary ring. The forces which act on the tire can be determined from the forces measured on the stationary ring of the wheel bearing during travel in a straight line or travel round a bend. Despite the large number of measurement locations, the problem with this measurement arrangement appears at the moment when the vehicle brake is actuated. Tests have shown that the wheel contact forces can no longer be exactly determined during the operation of the brake.

SUMMARY OF THE INVENTION

The invention has the object of indicating a measurement arrangement for a wheel bearing of a motor vehicle, from which measurement arrangement the wheel contact forces can be determined, even during braking.

DESCRIPTION OF THE INVENTION

This object is achieved by the invention.

The forces which act between the tire and the road surface are measured indirectly by means of the reaction forces in the wheel bearing. For this purpose, sensors (for example strain gauges or thin-film strain gauges) are arranged on the stationary ring of the wheel bearing and the reaction forces (the stress change) in the stationary ring of the wheel bearing are determined by these sensors. The wheel contact forces can be determined directly from these loads during travel without braking. During a braking process, however, the reaction forces in the wheel bearing are so strongly influenced by the forces introduced via the disk brake that the wheel contact forces can no longer be exactly determined. Only knowledge of the position and magnitude of the currently acting forces during the braking process makes it possible to draw conclusions about the forces and the current coefficient of friction between the road surface and the tire from the total forces which are recorded by the sensors on the stationary ring of the wheel bearing.

The spatial position of the center of gravity of the braking forces during the braking process can be continuously determined by the continuous measurement of the forces at the suspension points or in the support members of the flange-connected disk-brake caliper (center of gravity of the braking forces—calculated point of action of the vector of the braking forces on the brake disk or on the brake linings). The position of the center of gravity of the braking forces depends on the braking force introduced, the current coefficient of friction and the contact relationships between the brake lining and the disk brake. The current center of gravity of the braking forces can therefore be displaced both during a braking process and during the operating period. After reduction of the measured forces in the wheel bearing by the influence of the braking forces, it is possible to use the resulting wheel contact forces to carry out the braking process better than was possible with the prior art.

A further surprising advantage of the measurement arrangement according to the invention relative to EP 0 432 122 A2 and all the measurement wheels, is that for tangentially introduced wheel forces, the braking forces and the influences due to the road surface can be computationally differentiated by means of this measurement arrangement. If a vehicle travels over a soft subsurface (snow, gravel, soft ground, puddle), an accumulation of material forms in front of the tire and this must be pushed away. Pushing away in this manner causes a tangential force in the tire which has the same effect as the braking force. Due to the recording of the current braking forces, these horizontally acting forces can be unambiguously subdivided into braking forces and into forces which act from the road surface onto the tire. This advantage is all the more important because none of the measurement systems, which carry out measurements in the region of the wheel rim and of the tire, can differentiate between these forces. This possibility optimizes the braking process in the soft subsurface.

In a braking process of a driven wheel, furthermore, the forces which act in the brake disk can be differentiated from the driving forces (or driving torque), which are introduced via the drive train. This differentiation is necessary to permit optimum braking of these wheels when the clutch is not released (i.e. there is engine braking). This differentiation of the forces into driving forces from the drive train and braking forces is impossible with all the systems which carry out measurements in the wheel rim or in the tire.

The advantage of the arrangement of the sensors lies in the fact that all the sensors are arranged on a stationary component. This has particular advantages during the manufacture and fastening of the sensors. It avoids the problems of running cables to different components.

BRIEF DESCRIPTION OF THE DRAWINGS

FIGS. 3a, 3b show the influence of the position of the disk-brake caliper on the forces acting in the wheel bearing during the braking process.

FIGS. 4a, 4b show the influence, on the wheel bearing, which can appear due to the displacement of the position of the braking center of gravity within the brake lining during a braking process.

FIGS. 5a, 5b show the force relationships which act on the wheel bearing during a braking process in the soft subsurface. Separation into braking influences and road surface influences.

DETAILED DESCRIPTION OF THE DRAWINGS

Figure 1:
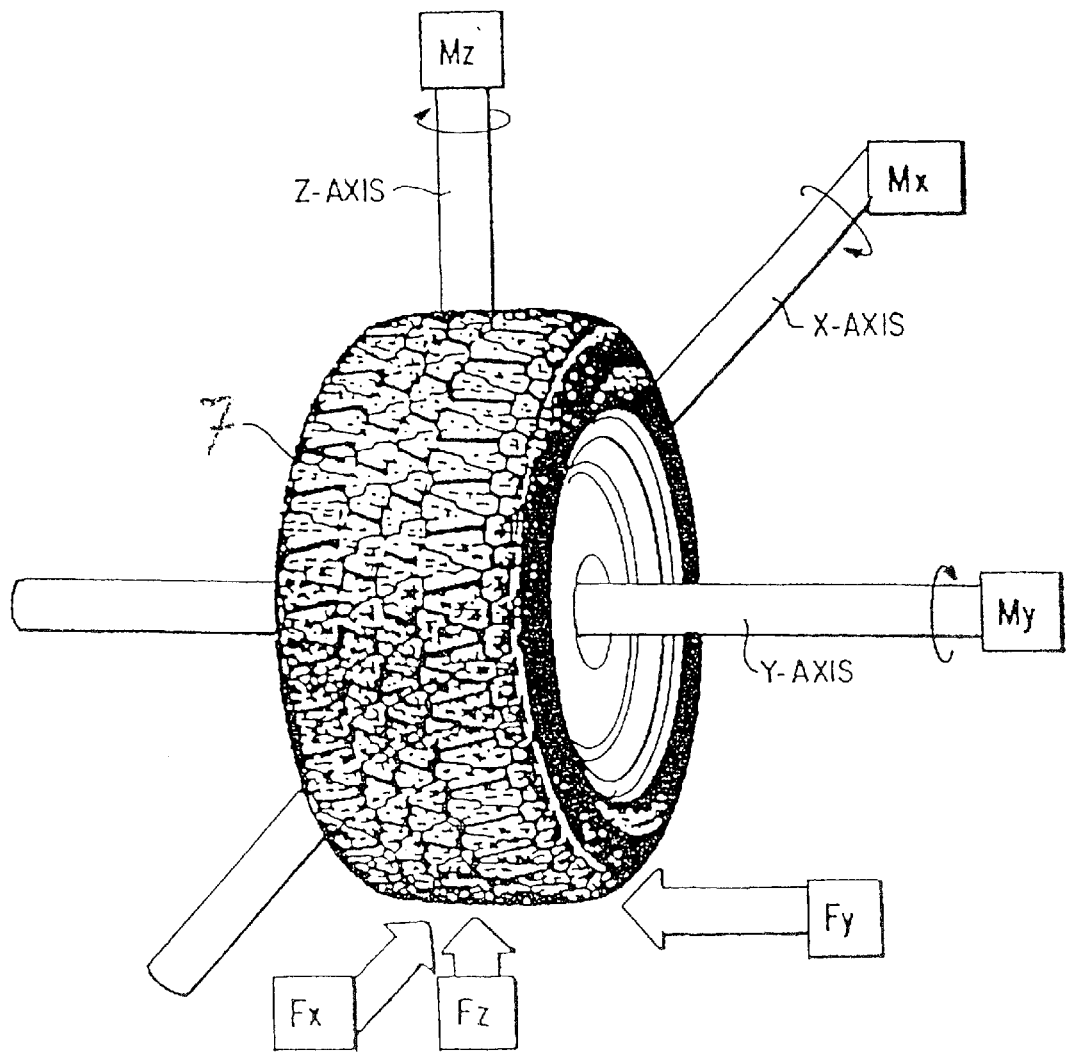
FIG. 1 shows the forces and torques which fundamentally have to be measured, as known from the prior art for example, DE 196 27 385 A1.

FIG. 1 shows a tire with the forces Fx, Fy, Fz and the torques Mx, My, Mz. The object of the measurement system according to the invention is to record these forces and torques, which act between the tire 7 and the road.

Figure 2:
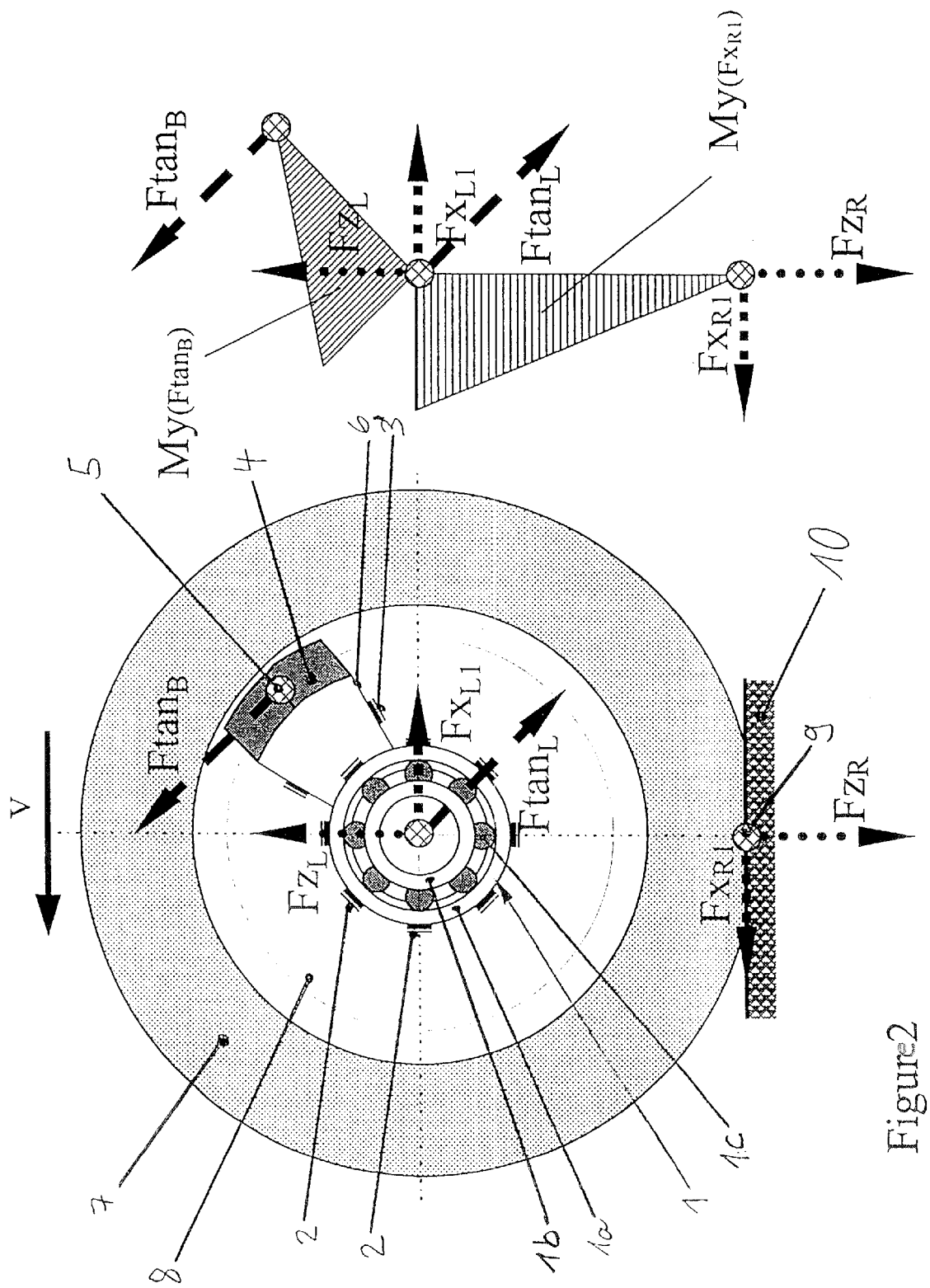
FIG. 2 shows the force relationships which appear between the brake disk, the wheel bearing and the road surface during a braking process.

FIG. 2 represents a wheel during the operation of the brake. So as not to overload the representation with force arrows, it is based on travel in a straight line. The known wheel contact forces Fyk during travel round a bend are not represented. The tire 7, the brake disk 8, the disk-brake caliper 4 (or brake lining) and the fastening of the brake-disk caliper 6 to the stationary outer ring 1a of the wheel bearing 1 are shown in this diagrammatic representation. The braking force FtanB acts on the brake disk, which is connected to the inner ring 1b of the wheel bearing 1 and retards the tire. The sensors 2 of the measurement arrangement are arranged on the stationary ring part 1a. The sensors 3 determine the forces in the brake support members in order, by this means, to determine the current point of action 5 (center of gravity) of the braking force and the magnitude of the braking force FtanB. The direction of motion of the wheel is designated by v. The braking force FtanB and the force FxR1 follow from the lever relationships between the tire and the current center of gravity of the braking force. The forces FtanB and FxR1 are supported in the wheel bearing between the inner ring and the outer ring. These forces induce reaction forces there in the form of FtanL and FxL1. The weight forces FzR between the tire 7 and the road surface 10 cause the forces FzL in the wheel bearing 1.

In consequence, there are always three force components (FxL1, FzL, FtanL) between the inner ring 1b and the stationary outer ring 1a of the wheel bearing 1 during travel in a straight line with the brake in operation.

My (FtanB) or My (FxR1) is the torque which acts during the operation of the brake.

The forces acting in the wheel bearing 1 between the inner ring 1b and the outer ring 1a, and which are measured by means of the sensors 2, are added geometrically in FIG. 3a in order to determine the resulting bearing force FresL,. In order to determine the wheel contact forces (FxL1, FzL), the influence of the braking forces FtanL are calculated from the measured bearing forces FresL. The current coefficient of friction between the tire and the road surface is determined from the ratio between FxL1 and FzL. In all other details, FIG. 3a corresponds to FIG. 2.

FIG. 3b shows that the arrangement of the disk-brake caliper 4a has a fundamental effect on the resulting bearing forces FresL. FIGS. 3a and 3b are drawn in with the same wheel contact forces 9 designated in each case. This representation shows clearly how the position of the disk-brake caliper 4a and therefore of the braking center of gravity 5a influences the measurement result FresL.

FIGS. 4a and 4b represent the problem that the braking center of gravity 5b, 5c within the brake linings 4 can be displaced during the operation of the brake. Different values for the resultant force FresL in the wheel bearing I result, depending on the center of gravity 5b, 5c of the braking force FtanB. In order to arrive at the currently acting wheel contact forces (FxL1, FzL) during the operation of the brake, the current effects of the braking force FtanL (measured by means of the sensors 3 on the support member 6) must be continuously calculated from the resultant bearing force FresL.

FIGS. 5a and 5b show a surprising advantage relative to the known measurement wheels and measurement methods in the tire. FIG. 5a represents the problems which arise when a tire moves in a soft subsurface 11. This soft subsurface leads to a displacement of the wheel contact forces. The force FxR2 must be produced within this soft subsurface 11 in order to displace it. This force FxR2 has a corresponding force in the wheel bearing FxL2. In this figure, the force relationships are shown without brake intervention. The evaluation of the measured braking forces (FtanB=0) shows that the horizontal force acts on the tire from the outside and is not caused by braking forces. In this figure, the support members 6 and the sensors 3 are not shown for reasons of clarity.

FIG. 5b represents the situation from FIG. 5a with braking now taking place on a soft subsurface 11. The forces acting horizontally on the tire 7 are represented in this case by the two force vectors FxR2 and FxR1. FxR2 corresponds to the force which acts on the tire due to the soft subsurface 11. FxR1 corresponds to the force which occurs in the horizontal direction due to the operation of the brake. The remaining force arrows correspond to the representations in the figures previously mentioned. Because of the exact knowledge of the braking force FtanB and the force FxR1, which is proportional via the lever arm to the braking force, the resulting bearing force FresL can be reduced by calculation by the forces FtanL and FxR1. All the magnitudes of the currently acting wheel contact force are therefore known. This separation of the forces which act tangentially on the tire 7 is not possible by means of the known systems of measurement wheels or adaptors because these systems are not aware of the braking forces. Even in extreme driving situations, therefore, the exact force relationships between the tire and the wheel surface can be determined because of the arrangement, according to the invention, of the sensors 2, 3 on the stationary ring 1a of the wheel bearing 1 and on the support members 6 of the disk-brake caliper 4.

Figure 6:
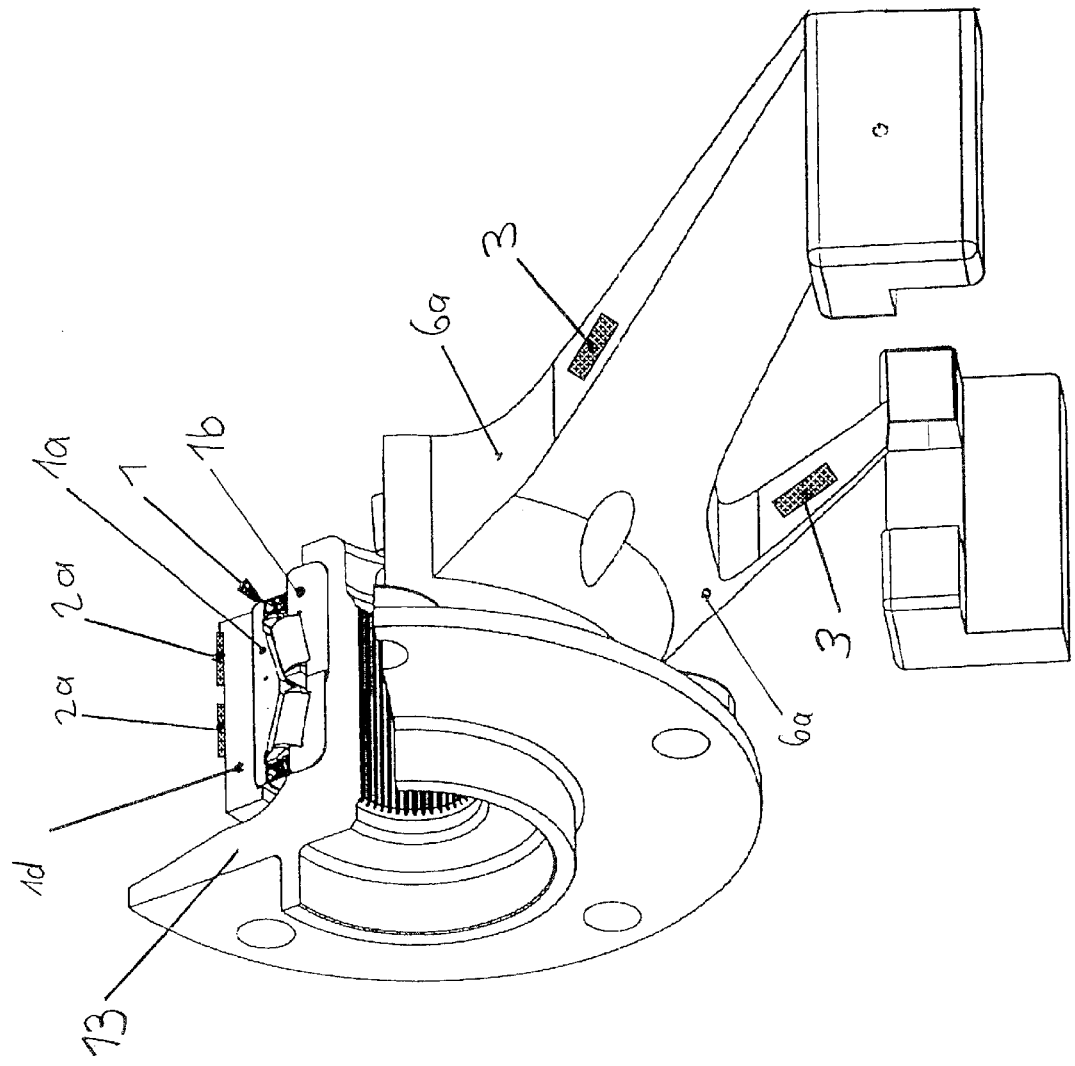
FIG. 6 shows a wheel bearing with support members, which are integrated on the stationary ring, for accepting the brake-disk caliper and associated sensors.

FIG. 6 shows a wheel bearing 1 in which two support members 6a, which accept the disk-brake caliper, are integrated on the housing 1d of the outer ring 1a. The disk-brake caliper, the brake lining and the brake disk are not shown in this representation. The flange 13 for accepting the wheel rim or the brake disk is connected to the inner ring 1b. The sensors 3 for measuring the braking force are arranged in the two arms of the support member 6a. The sensors 2a for measuring. the forces are attached to the housing 1d of the outer ring 1a.

Figure 7A:
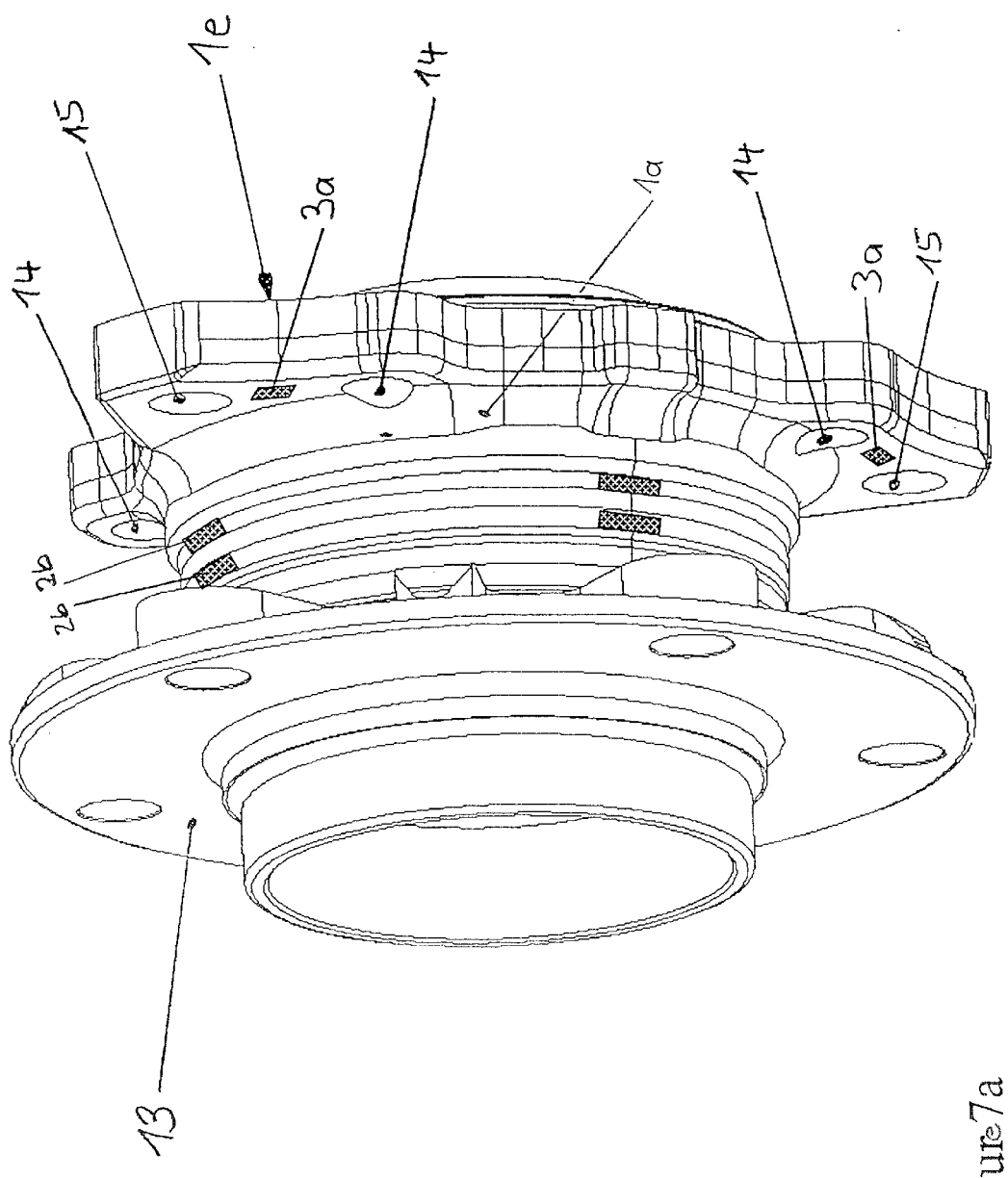
FIGS. 7a, 7b show a wheel bearing with additional fastening appliances for accepting the support member of the brake-disk caliper on the stationary rim of the wheel bearing, and associated sensors.
Figure 7B:
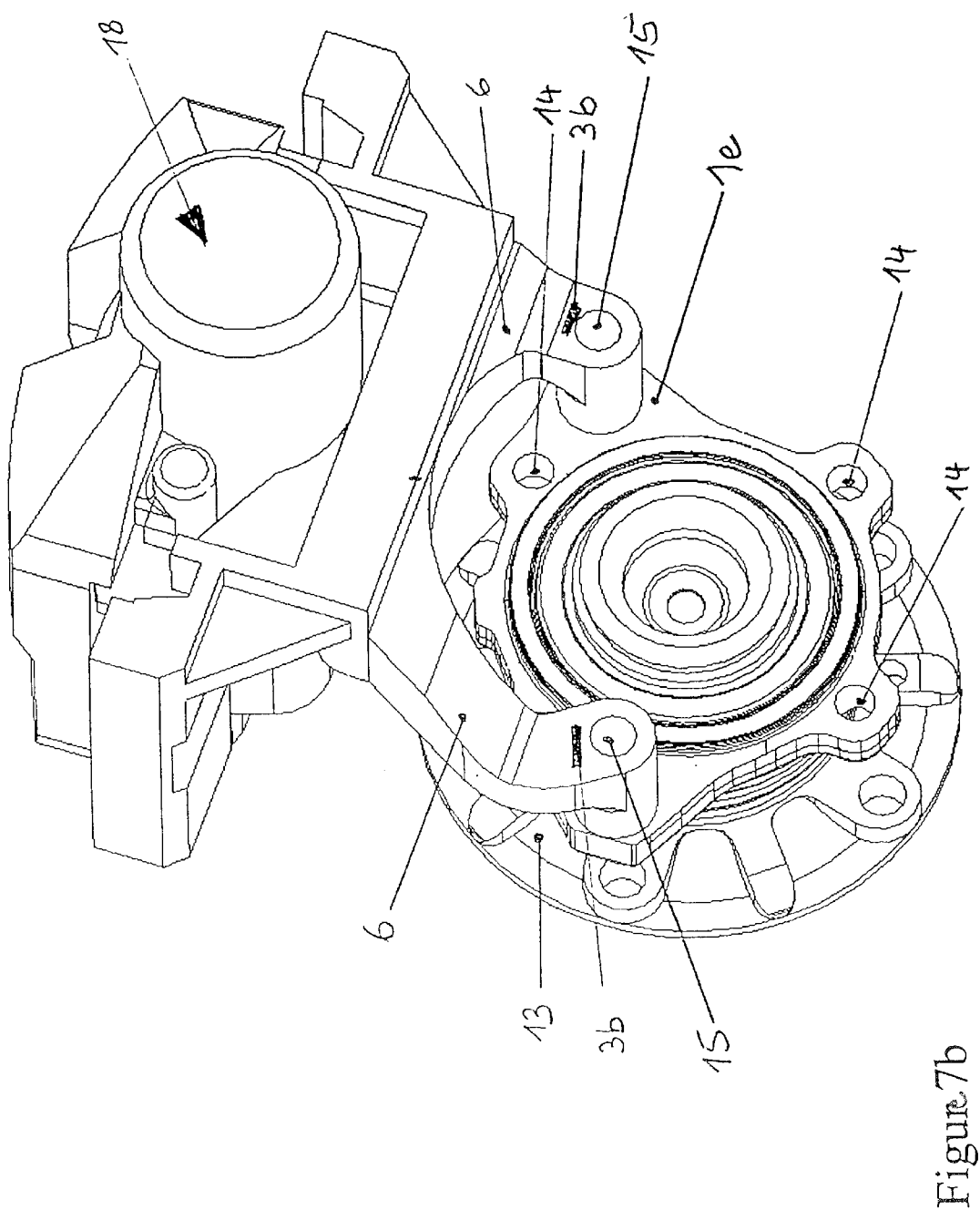
Figure 8:
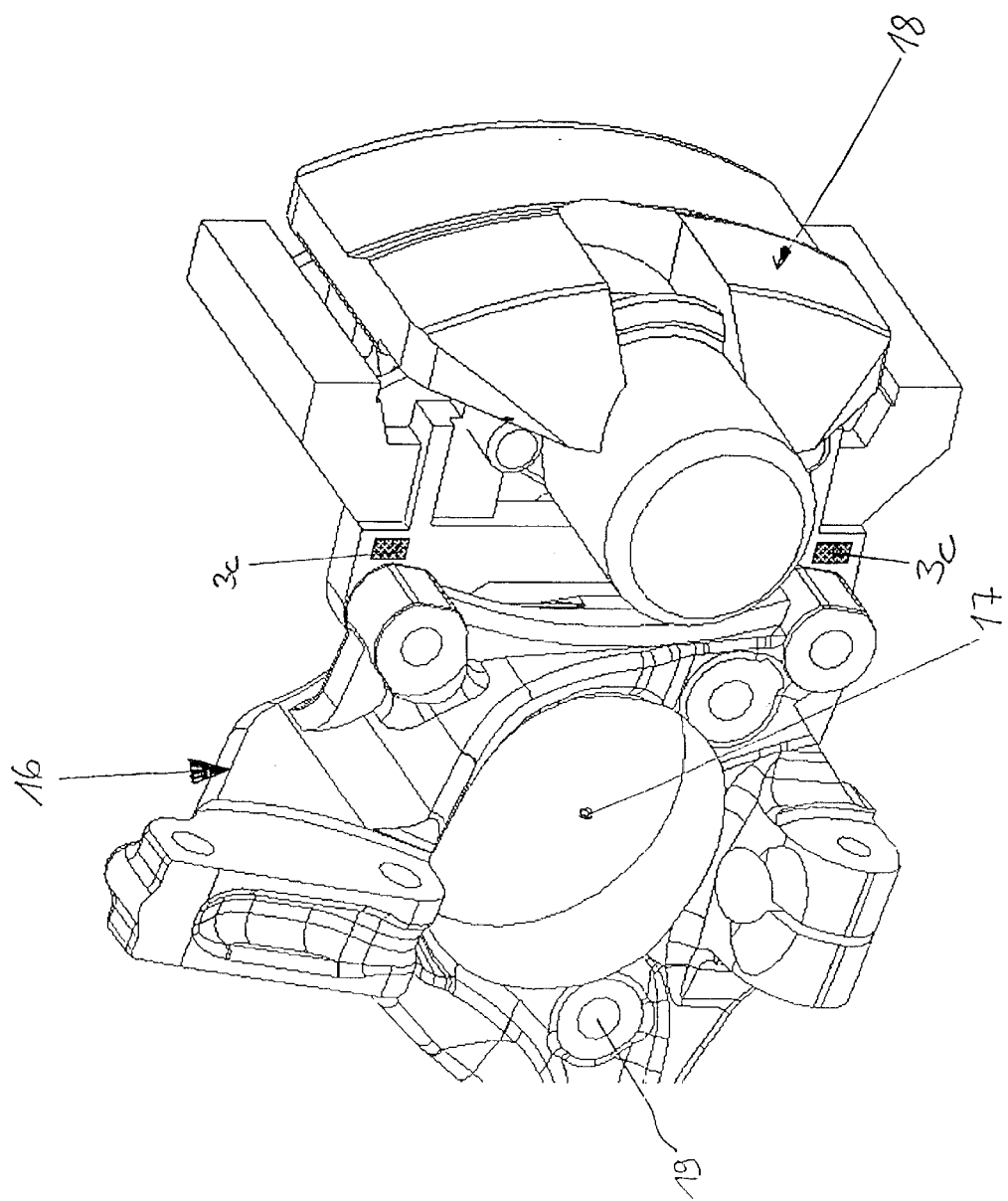
FIG. 8 shows a wheel bearing with the brake-disk caliper support members fastened to the swivel bearing, and a possible arrangement of the sensors.

FIG. 7a and FIG. 7b show a wheel bearing unit with disk-brake caliper fitted. FIG. 7a shows a wheel bearing unit with rotating flange part 13 and stationary outer ring 1a. The sensors 2b are arranged on the outer ring 1a. The sensors 2b are arranged in two planes in this representation so as to permit measurement of the tipping forces when the vehicle is traveling round a bend. The fastening holes 14 for acceptance in the swivel bearing (the swivel bearing is shown in FIG. 8) and the separate holes 15 for accepting the disk-brake caliper support member 6 are shown on the flange 1e of the stationary outer ring 1a. The sensors 3a, by means of which the braking force and the braking center of gravity are measured, are arranged in the flange region 1e at the holes 15. Advantages arise in handling and assembly due to the spatial proximity of the sensors 2b, 3a because all the sensors 2b, 3a are arranged on a stationary part.

FIG. 7b shows FIG. 7a with the disk-brake caliper 18 fastened over the support members 6. In this representation, the sensors 2b, 3a are not visible for perspective reasons. The disk-brake caliper 18 is fastened by means of the holes 15 through the disk-brake caliper support member 6. The wheel bearing unit is connected to the swivel bearing by means of the holes 14. The arrangement of the sensors 3b in the support members 6 of the disk-brake caliper 18 represents a further variant for determining the braking force and center of gravity.

FIG. 8 shows the swivel bearing 16. The wheel bearing is seated in the hole 17 of the swivel bearing 16 and is fastened by means of the holes 19. The wheel bearing is not shown in this representation. In this representation, the disk-brake caliper 18 with its support members is fastened to the swivel bearing 16. The sensors 3c for determining the braking force and center of gravity are represented.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of evaluating results from sensors disposed on the stationary ring of a wheel bearing, the method comprising:
   measuring forces in the stationary ring of the wheel bearing and measuring braking forces and relating the measured forces such that the influence of the braking force corresponding to the tangentially directed force on a caliper of a brake is calculated during braking from the resultant forces on the wheel bearing to determine the resultant wheel contact forces during braking along the three mutually perpendicular axes for controlling one of a braking force and other control systems in a vehicle using the resultant wheel contact forces.

2. A wheel bearing unit with force sensors, wherein
   the wheel bearing unit comprises a rotatable bearing ring, a stationary bearing ring with respect to which the rotatable bearing ring rotates;
   bearing elements disposed for enabling relative rotation between the rotatable bearing ring and the stationary bearing ring;
   first sensors arranged on the stationary bearing ring for sensing bearing forces between the rotatable bearing ring and the stationary bearing ring of the wheel bearing unit;
   a disk brake caliper supported at the wheel bearing unit; and
   at least one second sensor arranged between the stationary bearing ring and the disk brake caliper for measuring the forces which act on the disk brake caliper during operation of the brake.

3. The wheel bearing unit of claim 2, further comprising two disk brake caliper support members extending between the disk brake caliper and the wheel bearing unit; and
   a second sensor attached to each of the two disk brake caliper support members, such that the second sensors measure the braking forces acting on the disk brake caliper and measure the center of gravity of the braking forces.

4. The wheel bearing unit of claim 2, further comprising a flange on the stationary bearing ring, the flange having receiving openings, and the disk brake caliper having a disk brake caliper support member fastened to the openings on the flange.

5. The wheel bearing unit of claim 4, further comprising second openings on the flange for receiving the disk brake caliper support member, the second openings being offset relative to the first openings for the disk brake caliper support member.

6. The wheel bearing unit of claim 5, wherein there are a plurality of the second openings for the disk brake caliper support member on the flange; at least one second sensor being arranged at each of the second openings on the flange and the second sensor being operable for measuring the braking forces and the center of gravity of the braking forces.

7. The wheel bearing unit of claim 2, wherein the stationary bearing ring is outward of the rotatable bearing ring.

* * * * *